US007508755B2

United States Patent
Liu

(10) Patent No.: US 7,508,755 B2
(45) Date of Patent: Mar. 24, 2009

(54) METHODS AND DEVICES FOR CREATING AN ALTERNATE PATH FOR A BI-DIRECTIONAL LSP

(75) Inventor: Hua Autumn Liu, Holmdel, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 989 days.

(21) Appl. No.: 10/613,103

(22) Filed: Jul. 7, 2003

(65) Prior Publication Data
US 2005/0007950 A1    Jan. 13, 2005

(51) Int. Cl.
*G04R 31/08*    (2006.01)

(52) U.S. Cl. .............. 370/228; 370/395.32; 370/401
(58) Field of Classification Search .......... 370/221, 370/401, 392, 389, 216, 217, 227, 228, 238, 370/244, 338, 351, 352
See application file for complete search history.

(56) References Cited

U.S. PATENT DOCUMENTS

| 6,895,008 | B2 * | 5/2005 | Enoki et al. .......... 370/392 |
| 2003/0063613 | A1 * | 4/2003 | Carpini et al. .......... 370/401 |

* cited by examiner

*Primary Examiner*—Seema S Rao
*Assistant Examiner*—Wanda Z Russell

(57) ABSTRACT

Upon the detection of a failure along a bi-directional label switched path, traffic in both forward and backward directions is re-routed to the same alternate path.

25 Claims, 3 Drawing Sheets

METHODS AND DEVICES FOR CREATING AN ALTERNATE PATH FOR A BI-DIRECTIONAL LSP

BACKGROUND OF THE INVENTION

A Multi-Protocol Label Switched (MPLS) network is a communication network made up of a plurality of network devices which transfer or forward packets of information using so-called virtual connections referred to as "label switched paths" (LSPs).

A conventional LSP begins at a source network device, passes through intermediate network devices and ends at a destination network device.

If a failure at a network device or link (failure point) occurs downstream of a source network device, so-called existing MPLS Fast Re-routing techniques are employed to bypass the failure.

Existing MPLS Fast Re-routing techniques are effective in re-routing MPLS labeled traffic in an LSP acting independently relative to other LSPs. However, when LSPs are bundled together to operate in two directions, such as in bi-directional LSPs disclosed in U.S. patent application Ser. No. 10/613,104, MPLS Fast Re-routing does not perform well.

MPLS Fast-Re-routing attempts to re-route traffic from a forward LSP to a predetermined alternate path. However, because many times there is no predetermined alternate path for a backward LSP in a bi-directional LSP, once a failure occurs no traffic is allowed to flow in the backward direction. As a result, the bi-directional LSP can no longer operate as a bi-directional LSP; it now operates as a uni-directional LSP.

MPLS Fast-Re-routing is also deficient when both the forward and backward LSPs do in fact have alternate LSPs. In such a instance, MPLS Fast-Re-routing creates two separate alternate paths (i.e., using different network elements) one for each direction, to overcome a failure. One path allows traffic in an original, forward LSP to bypass a failure while the other path allows traffic from an original backward LSP to bypass the failure. Creating different alternate paths for the forward and backward LSPs of a bi-directional LSP makes it difficult to ensure the same quality of service.

SUMMARY OF THE INVENTION

The present invention re-routes traffic traveling in both directions from a bi-directional LSP to an alternate path using the same network elements.

In accordance with one embodiment of the invention, an originating network device is operable to re-route traffic traveling in a forward direction to an alternate path in the forward direction, and to transmit a switch over message along the alternate path in the forward direction to a network device responsible for re-routing traffic traveling along the bi-directional LSP in a backward direction to the alternate path.

DETAILED DESCRIPTION OF THE INVENTION

Figure 1:
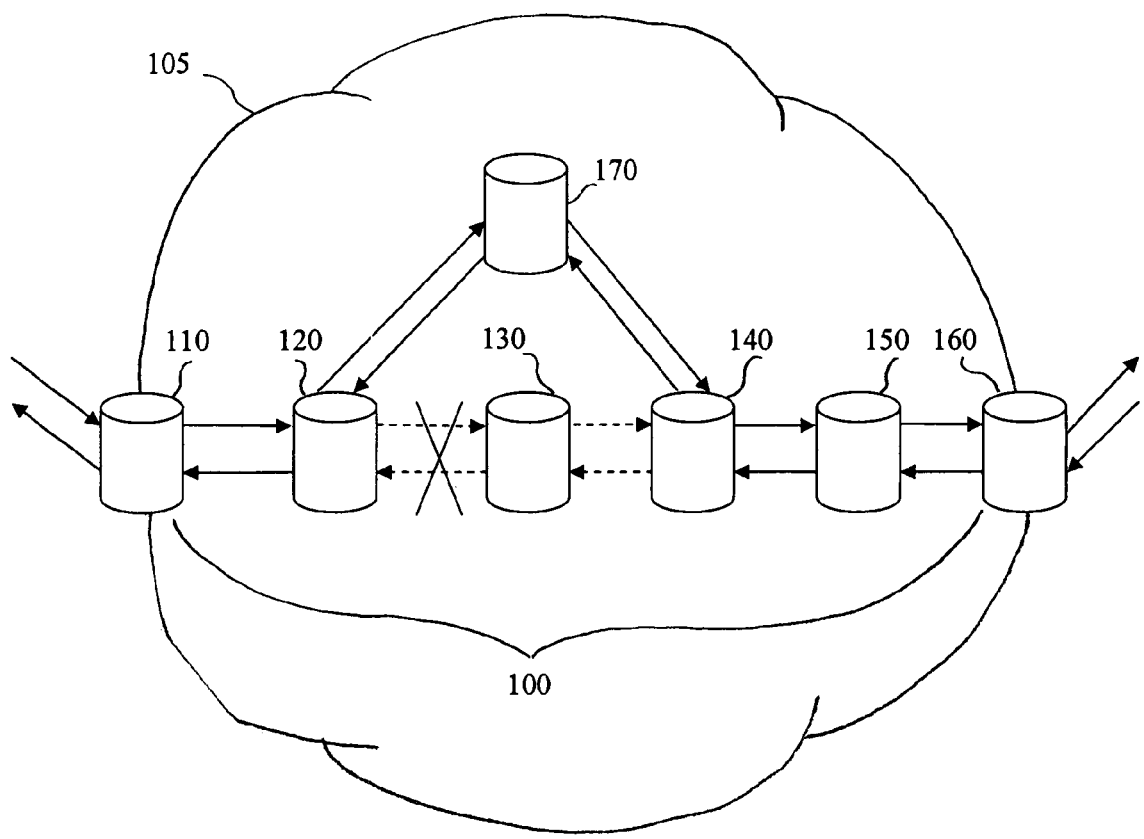
FIG. 1 is a simplified block diagram showing an MPLS network which includes elements capable of re-routing bi-directional LSP traffic upon detection of a failure in accordance with the present invention.

FIG. 1 is a simplified block diagram showing an MPLS network 105 which includes elements capable of re-routing bi-directional LSP traffic upon detection of a failure in accordance with the present invention.

Figure 2:
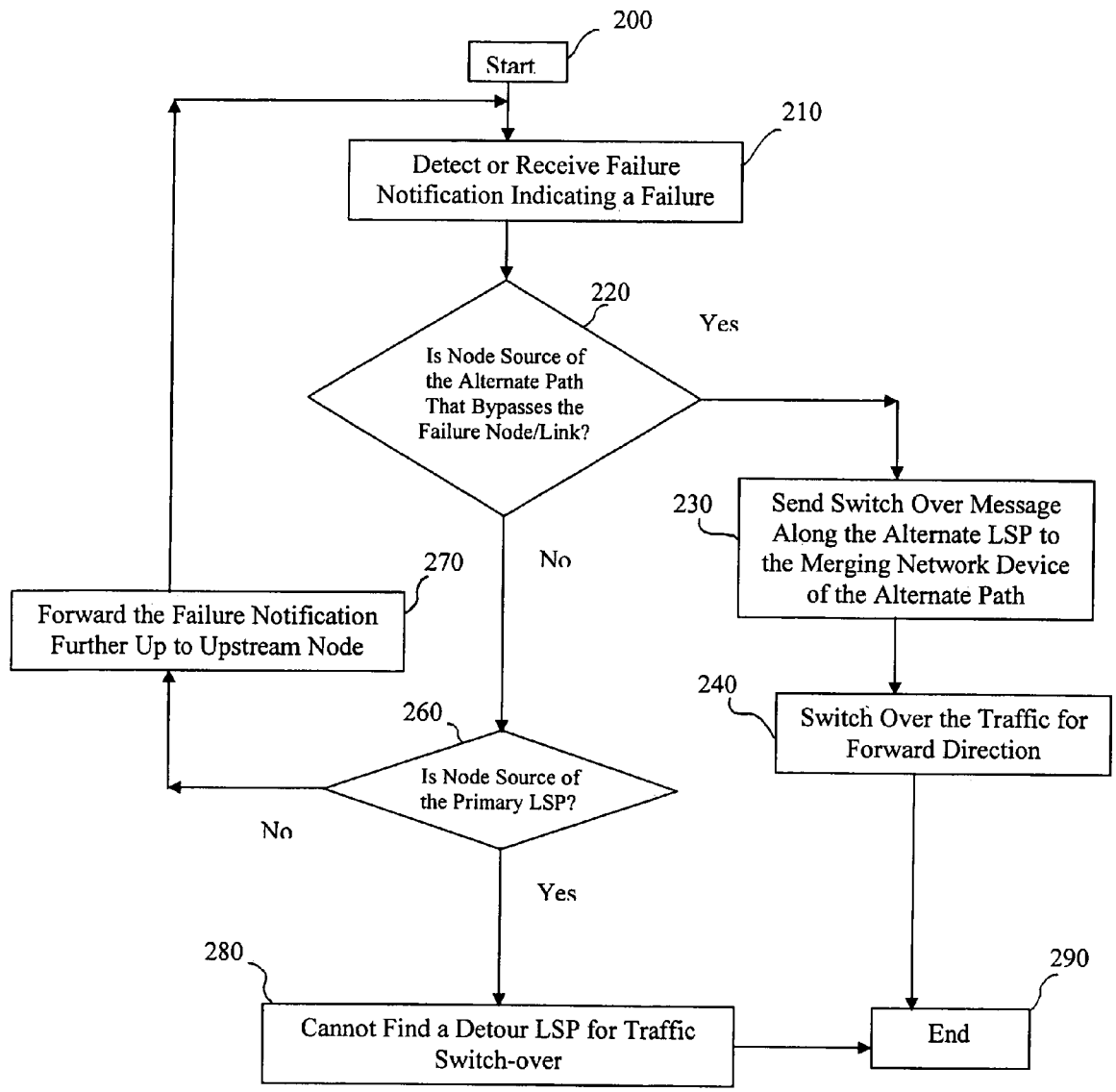
FIG. 2 is a simplified flow diagram depicting the re-routing of MPLS traffic according to an embodiment of the invention.

As shown in FIG. 1, a primary bi-directional LSP 100 includes network devices 110, 120, 130, 140, 150, and 160. An "X" denotes a failure point between network devices 120 and 130. Upon detection of the failure, network device 120 takes on the role of an "originating" network device of an alternate path. The originating network device determines an alternate path (elements 120,170 and 140) or uses a stored predetermined, alternate path to send a "switch over" message to "merging" network device 140. Upon receiving the message, device 140 creates an alternate path in the backward direction using the same network elements. Once the originating network device 120 and the merging network device 140 have determined the alternate path, they perform a switch over so that, in this example, both follow the same alternate path that passes through network device 170 as shown in FIG. 1. It should be understood that although the singular of "path" is used here to describe an alternate path, in fact, such a path is made up of two LSPs; one in a forward direction and one in a backward direction. By "same path" is meant that each of these LSPs uses the same physical network devices, e.g., devices 120, 170 and 140 in FIG. 1. FIG. 2 provides more detail into how this process works.

FIG. 2 depicts a simplified flow diagram of technique(s) for re-routing MPLS traffic according to an embodiment of the invention. It should be understood that such techniques may, for example, be implemented in hardware, software, firmware or some combination of the three in a control processing section or the like of a network device (e.g. network device 120). The process depicted in FIG. 2 is used to first identify an originating network device which is not a source node and, second, to set up an alternate path between the originating network device and a merging network device.

Beginning with step 210, a control processing section of a network device is operable to detect or receive a failure notification message indicating that a failure has occurred along a link or interface making up a part of a primary path. At step 220, the control processing section is operable to determine whether its' associated network device can operate as an originating network device in an alternate LSP. If so, the control processing section, at step 230, sends a switch over message along an alternate path to the merging network device (e.g., network device 140). The switch over message includes routing information for use by the merging network device to switch traffic to the same alternate path but in the backward direction. After the switch over message has been sent to the merging network device, the originating network device (via the control processing section) performs a switch over, at step 240, so that traffic flowing in the forward direction can travel along the alternate path. The process ends at step 290.

If, however, at step 220, the control processing section determines that its' associated network device cannot be an originating network device, the control processing section is operable to determine, at step 260, whether the associated network device is a source network device of a primary LSP. If so, the control processing section determines that it will be unable to create an alternate path at step 280, and the process ends at step 290. This is so, because bi-directional Fast Re-routing uses some of the functionality of traditional MPLS Fast Re-routing which does not function at a source network device.

If at step 260, the associated network device is not a source network device, a failure notification is forwarded to another network device upstream at step 270. The process then begins again at step 210 in the upstream network device.

The process in FIG. 2 focuses on an originating network device, which is not a source network device, setting up an alternate path. The merging network device is also active in setting up the alternate path as shown in FIG. 3.

Figure 3:
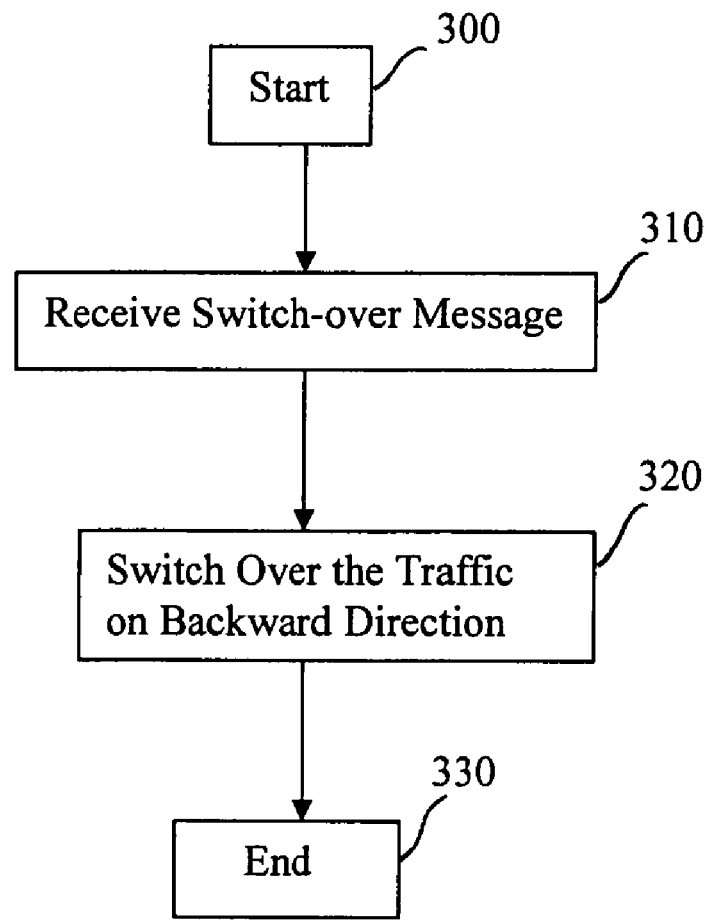
FIG. 3 is a simplified flow diagram depicting the re-routing of MPLS traffic according to another embodiment of the invention.

FIG. 3 is a simplified flow diagram of technique(s) which can be implemented in a merging network device to re-route MPLS traffic to an alternate path according to an embodiment of the invention.

Beginning with step 310, a control processing section or the like of a merging network device is operable to receive a switch over message. The switch over message is used by the control processing section to determine an alternate path in the backward direction. Once the merging network device receives the switch over message and determines an alternate path in the backward direction, the control processing section switches, at step 320, backward flowing traffic to the alternate path.

The switch overs illustrated in FIGS. 2 and 3, create an alternate path that allows traffic to flow in both the forward and backward directions along the same alternate path.

After a failure is resolved, the originating network device is operable to once again allow traffic to travel along the primary bi-directional LSP in the forward direction. The originating network device is further operable to transmit a second message along the alternate path in the forward direction to the merging network device to once again allow traffic to travel along the primary bi-directional LSP in the backward direction.

As indicated above, a control processing section may be used to implement the embodiments shown in FIGS. 1-3. The control processing section may be implemented using hardware, software, firmware, or some combination of the three. In one embodiment of the present invention, the control processing section sends and receives MPLS traffic to and from MPLS network devices. In addition to the functions already described above, the control processing section is operable to add labels to MPLS packets, to set up traffic paths or to update routing information for an MPLS network, and to monitor traffic paths to determine if a failure has occurred. The control processing section may be implemented on several platforms and may comprise one or more of the following: an MPLS module, routing manager, ReSerVation Protocol-Traffic Engineer (RSVP-TE) module, a link manager, and connection manager operable to carry out the functions described throughout this description.

It has been noted that some of the embodiments may be implemented in hardware, software, firmware and the like. These implementations may comprise a combination of processor(s) and article(s) of manufacture, such as storage media and executable computer program(s), for example. The executable computer program(s) may comprise instructions to perform the above described functions and operations. The computer executable program(s) may also be provided by, or as a part of, an externally supplied propagated signal(s) either with or without a carrier wave(s).

The discussion above describes various exemplary embodiments of the present invention. Variations of the examples given above may be derived without departing from the spirit or scope of the present invention. It is next to impossible, however, to present each and every possible variation or example of the present invention. Rather, the scope of the invention is determined by the claims which follow. The following claims should be accorded the broadest interpretations possible to cover any modifications or equivalent structures while at the same time retaining the claimed inventions validity.

What is claimed is:

1. A system for re-routing traffic from a bi-directional Label Switched Path (LSP) comprising:
   an originating network device to:
   re-route traffic traveling along a bi-directional LSP in a forward direction to an alternate path in the forward direction; and
   transmit a switch over message along the alternate path in the forward direction to a merging network device responsible for re-routing traffic traveling along the bi-directional LSP in a backward direction to the alternate path in the backward direction.

2. The system of claim 1, wherein the originating network device is further to transmit a second message, along the alternate path in the forward direction, to the merging network device to allow traffic to travel along the bi-directional LSP in the backward direction when a failure is no longer detected.

3. The system of claim 1, wherein the originating network device is a multi-protocol label switched (MPLS) device.

4. The system of claim 1 wherein the bi-directional LSP is comprised of an LSP carrying traffic in the forward direction and another LSP carrying traffic in the backward direction.

5. The system of claim 1 further comprising a merging network device to receive the switch over message and to re-route traffic traveling along the bi-directional LSP in the backwards direction to the alternate path in the backwards direction based on the switch over message.

6. The system of claim 5, wherein, the merging network device is further to: receive a second message along the alternate path in the forward direction; and allow traffic to travel along the bi-directional LSP in the backward direction when a failure is no longer detected based on said second message.

7. The system of claim 5 wherein the merging network device is a MPLS device.

8. The system of claim 1 further comprising a merging network device which comprises means for receiving the switch over message and means for re-routing traffic traveling along the bi-directional LSP in the backwards direction to the alternate path in the backwards direction based on the switch over message.

9. The system of claim 8, wherein, the merging network device further comprises: means for receiving a second message along the alternate path in the forward direction; and means for allowing traffic to travel along the bi-directional LSP in the backward direction when a failure is no longer detected based on said second message.

10. A merging network device operable to: receive traffic traveling along a bi-directional LSP in a forward direction to an alternate path in the forward direction; receive a switch over message along the alternative path in the forward direction; and re-route traffic traveling along a bi-directional LSP in a backwards direction to an alternate path in the backwards direction based on the switch over message.

11. The device as in claim 10 further operable to: receive a second message along the alternate path in the forward direction; and allow traffic to travel along the bi-directional LSP in the backward direction when a failure is no longer detected based on said second message.

12. The device of claim 10 wherein, the merging network device is a MPLS device.

13. A method for re-routing traffic from a bi-directional LSP comprising the steps of: re-routing traffic traveling along a bi-directional LSP in a forward direction to an alternate path in the forward direction; and transmitting a switch over message along the alternate path in the forward direction to a merging network device responsible for re-routing traffic traveling along the bi-directional LSP in a backward direction to the alternate path in the backward direction.

14. The method of claim 13 further comprising the step of: transmitting a second message, along the alternate path in the forward direction, to the merging network device to allow traffic to travel along the bi-directional LSP in the backward direction when a failure is no longer detected.

15. The method of claim 13 wherein the bi-directional LSP is comprised of an LSP carrying traffic in the forward direction and another LSP carrying traffic in the backward direction.

16. The method of claim 13 further comprising the steps of: receiving the switch over message; and re-routing traffic traveling along the bi-directional LSP in the backwards direction to the alternate path in the backwards direction based on the switch over message.

17. The method of claim 16 further comprising the steps of: receiving a second message along the alternate path in the forward direction; and allowing traffic to travel along the bi-directional LSP in the backward direction when a failure is no longer detected based on said second message.

18. A method for re-routing traffic comprising the steps of: receive traffic traveling along a bi-directional LSP in a forward direction to an alternate path in the forward direction; receiving a switch over message along the alternative path in the forward direction; and re-routing traffic traveling along a bi-directional LSP in a backwards direction to an alternate path in the backwards direction based on the switch over message.

19. The method of claim 18 further comprising the steps of: receiving a second message along the alternate path in the forward direction; and allowing traffic to travel along the bi-directional LSP in the backward direction when a failure is no longer detected based on said second message.

20. A system for re-routing traffic comprising: an originating network device comprising: means for re-routing traffic traveling along a bi-directional LSP in a forward direction to an alternate path in the forward direction; and means for transmitting a switch over message along the alternate path in the forward direction to a merging network device responsible for re-routing traffic traveling along the bi-directional LSP in a backward direction to the alternate path in the backward direction.

21. The system of claim 20, wherein the originating network device further comprises means for transmitting a second message, along the alternate path in the forward direction, to the merging network device to allow traffic to travel along the bi-directional LSP in the backward direction when a failure is no longer detected.

22. The system of claim 20 wherein the bi-directional LSP is comprised of an LSP carrying traffic in the forward direction and another LSP carrying traffic in the backward direction.

23. A merging network device comprising: means for means for receiving traffic traveling along a bi-directional LSP in a forward direction to an alternate path in the forward direction; receiving a switch over message along the alternative path in the forward direction; and means for re-routing traffic traveling along a bi-directional LSP in a backwards direction to an alternate path in the backwards direction based on the switch over message.

24. The device as in claim 23 further comprising: means for receiving a second message along the alternate path in the forward direction; and means for allowing traffic to travel along the bi-directional LSP in the backward direction when a failure is no longer detected based on said second message.

25. A system for re-routing traffic comprising: means for re-routing traffic traveling along a bi-directional LSP in a forward direction to an alternate path in the forward direction; means for transmitting a switch over message, along the alternate path in the forward direction, for re-routing traffic traveling along the bi-directional LSP in a backward direction; means for receiving the switch over message; and means for re-routing traffic traveling along the bi-directional LSP in a backwards direction to the same alternate path in the backwards direction based on the switch over message.

\* \* \* \* \*